United States Patent Office 3,070,174
Patented Dec. 25, 1962

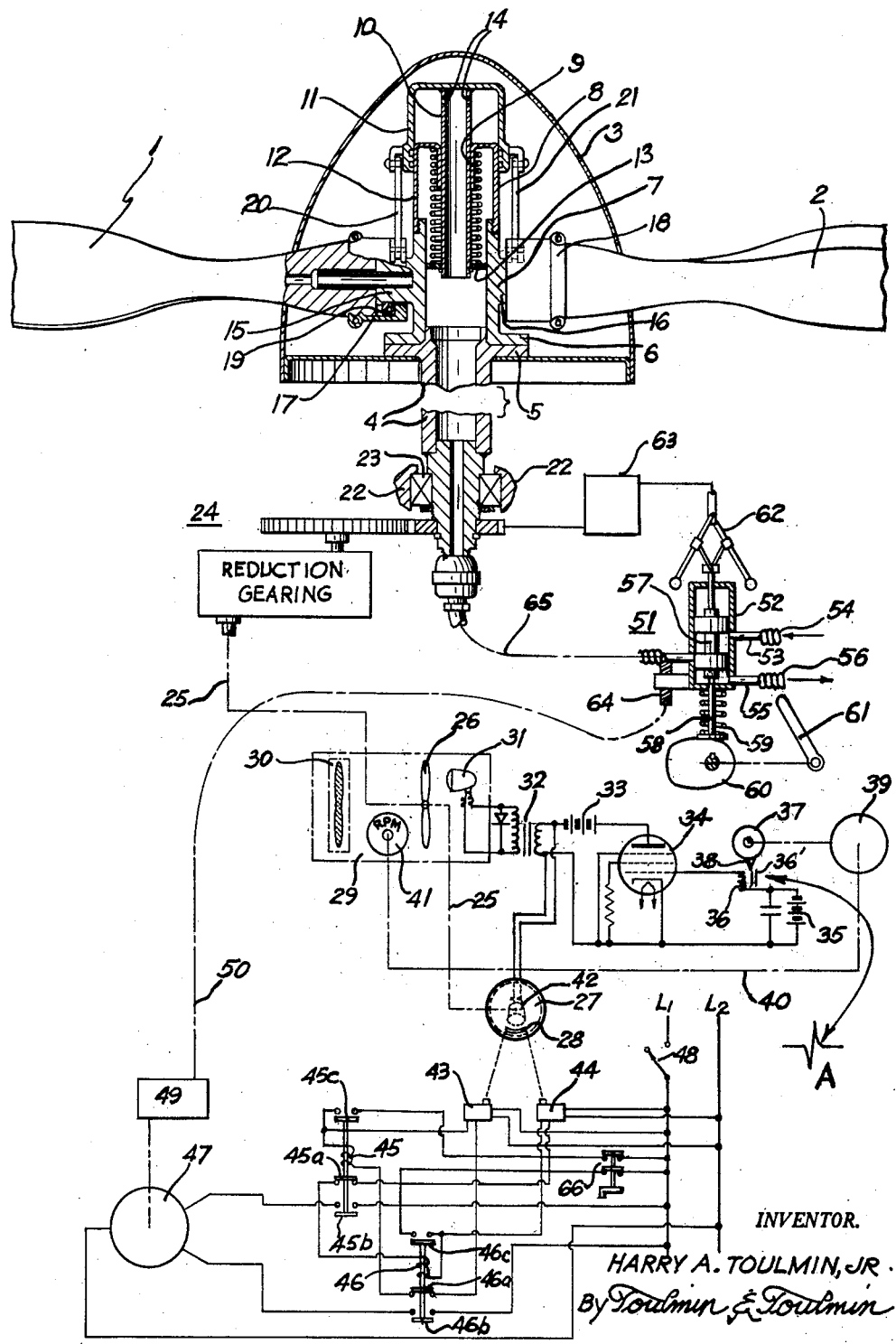

3,070,174
SPEED CONTROL APPARATUS FOR
AIRCRAFT PROPELLERS
Harry A. Toulmin, Jr., Dayton, Ohio, assignor to
Basic Research Inc., Dayton, Ohio
Filed July 31, 1961, Ser. No. 127,922
5 Claims. (Cl. 170—160.17)

The present invention relates to a speed control apparatus for aircraft propellers having blades with adjustable pitch.

Pitch adjustable propellers are common in today's modern aircrafts. Adjustment of this pitch alters the resistance exerted by the air upon the propeller blades, the balance of force and action on the propeller is, therefore, altered resulting in a change of the propeller speed.

It is an object of the present invention to provide a new and improved control apparatus permitting a variable speed control of an aircraft propeller in altering the pitch of its blades.

It is another object of the present invention to provide a new and improved follow-up control apparatus for aircraft propellers in which the principle employed for achieving the control action serves simultaneously as a provision for accurately indicating such control action to the pilot.

According to one aspect of the present invention in a preferred embodiment thereof, it is suggested to derive a rotary motion from the propeller in synchronism therewith which rotary motion is used to drive a slotted disc; simultaneously a train of signal or switching pulses are produced having a predetermined frequency; in other words the switching pulses are equally spaced from each other. The train of switching pulses is employed to control a light flashing device, thus producing in turn a train of equally spaced light pulses emitted toward the rotating disc. A photoelectric detector device including two photoelectric receivers or detector amplifiers are disposed so as to sense those light pulses passing through the slot of the rotating disc. The output of the two receivers or detectors is employed to control an electro-hydraulic conversion system phase sensitively controlling a hydraulic actuator which adjusts the propeller pitch. The just mentioned electro-hydraulic conversion system is preferably comprised of two relays mutually exclusively controlled by the detectors, and the two relays govern the current supply to a reversible electric motor which in turn controls a hydraulic valve; the valve governs exhaust and supply of a pressure fluid from and to the hydraulic actuator for the pitch adjustment.

In addition, the slotted disc runs in synchronism with an "instrument" propeller illuminated in synchronism with the train of switching pulses. The image of this instrument propeller indicates to the pilot synchronism or asynchronism of the aircraft propeller with respect to the train of switching pulses.

While the specification concludes with claims particularly pointing out and distinctly claiming the subject matter which is regarded as the invention, it is believed that the invention, the objects and features of the invention, and further objects and features and advantages thereof, are better understood from the following description taken in connection with the accompanying drawing in which is shown in cross-sectional view an aircraft propeller with its pitch adjustment device; there is further illustrated in this drawing, a circuit diagram for the control circuit governing this pitch adjustment device.

In the drawing there is first shown a propeller having blades 1 and 2 rotating together with the casing 3 mounted on a hollow shaft 4. Shaft 4 is provided with a flange 5 in which is secured a flange 6 of a hollow drive hub 7 terminating in a hollow piston 8 having a stem portion 9.

A tube 10 is slidably received by stem portion 9 and carries a cylinder 11 sealingly engaging piston 8. A spring 12 rests against piston 8 as well as against a disc 13, which is secured to a tube 10. The inner portion of tube 10 communicates with cylinder 11 by means of port holes 14.

Hub 7 has two protruding studs 15 and 16 serving as support for blades 1 and 2 respectively. Blades 1 and 2 are provided with clamps 17 and 18, respectively, and a roller thrust bearing 19 rotatably engages blade 1 with stud 15. There is a corresponding thrust bearing for blade 2 and stud 16 which is not shown.

Turning the blades about the supporting studs causes the propeller pitch to be varied.

Mechanical links 20 and 21 pivotally connect cylinder 11 with blades 1 and 2, respectively. Thus, when cylinder 11 moves up and down with respect to piston 8, blades 1 and 2 are simultaneously and respectively pivoted about studs 15 and 16.

Tubular shaft 4 is journalled in the housing of the plane which is indicated by reference numeral 22, and there is provided a bearing 23 for this shaft 4. The rotary gear of the propeller and shaft 4, as well as the engine driving the propeller, are not shown for reasons of simplicity, and it is understood that these elements are of conventional design.

Proceeding now to the control device of the present invention, there is provided a reduction gearing 24 for the propeller shaft, reducing the rotation thereof, for example, by 20 to 1 or 50 to 1, and serving as a sensing means driving a rotary motion from the propeller, as indication of the rotation thereof. The output shaft of reduction gearing 24 is indicated only schematically and denoted with reference No. 25. A small instrument propeller 26 and a disc 27 having a slot 28, are mounted on a shaft 25 and rotate therewith.

Reference No. 29 notes a schematic view of a portion of the instrument panel in the cockpit having a screen, for example, made of frosted glass 30. Behind the screen is located the instrument propeller 26. The propeller 26 and screen 30 are in line with a stroboscopic lamp 31, which is connected to a high voltage secondary winding of a transformer 32 having a low voltage primary winding connected to a voltage source 33 and an electron tube 34. There is a rectifier connected across the high voltage secondary winding in order to short circuit the pulses of one direction occurring therein.

The control grid of electro tube 34 is connected to a D.C. voltage source 35 via an inductor 36 having a core 36'. The core 36' co-operates with a rotating permanent magnet 37 having a sharp blade 38 as one of its poles. Preferably, core 36' has an edge over which is passing a blade 38 once during every revolution of magnet 37. It is apparent that two voltage peaks are produced by induction in coil 36 when this blade 38 passes over core 36'. These two voltage peaks are indicated schematically by reference character A, with a sharp flank occurring when blade 38 is momentarily directly over or above the edge of core 36'. Magnet 37 is driven by a variable speed drive 39 of any suitable type, for example, a field or armature voltage controlled D.C. motor, elements 36, 37, 38 and 39 constitute the input signal source for the control apparatus of the invention. In other words the train of pulses produced by induction in coil 36 are the input pulses employed for the control of the propeller speed. There is a shaft 40 linking motor 39 to an indicator instrument 41 in the panel 29.

The anode circuit of electron tube 34 also includes a lamp 42 which may be a glow discharge lamp or also a stroboscope lamp positioned behind disc 27 at a location which is axially displaced therefrom, the light of lamp 42 is directed toward disc 27 at a spot thereof, which is located in the path of slot 28.

On the other side of disc 27 there are positioned two photo-electric detector amplifiers 43 and 44 of known design, photo diodes, photo cells with a transistor or electron tube amplifier connected thereto. The electrical outputs of photoelectric detector amplifiers 43 and 44 have to be sufficiently strong to energize a relay. Detector amplifiers 43 and 44 are connected to power lines L1 and L2 and they are supplied with electric current therefrom.

Detector amplifiers are so placed that their detector ranges overlap in a limited range. This means that light from lamp 42 may reach both of the detectors when slot 28 has a particular position.

The output circuit of amplifier 43 comprises a relay 45, and a series connected contact blade 46a. Relay 45 controls a blade 45a, which is normally closed, and the control blade 45b which is normally open, but, when closed, blade 45b connects the selsyn motor 47 to power line L1. Detector amplifiers 44 has an output circuit which includes the relay 46 controls the blade 46a already mentioned. Relay 46 controls another blade, denoted with reference No. 46b, which also governs the current supply to motor 47. The energization current for relay 46 passes over blade 45a. Blade 46b when closed, connects selsyn motor 47 to power line L1.

Closing of either blade 45b or 46b causes motor 47 to run in opposite directions, and each relay has a third blade 45c and 46c, respectively, which close holding circuits for their relays. The circuit breaker 66 for both holding circuits is actuated in synchronism with either shaft 25 or 40 by an appropriate cam—not shown.

It should be mentioned that the holding circuits of breaking circuits including element 66 of the relays can be omitted and that the relays can be one with delayed release time.

A switch 48 in line L1 governs the power supply to elements 43, 44, 45, 46 and 47. When switch 48 is open, the control circuit is interrupted, but it will be understood from the following that in this case a manual pitch control is made possible.

Motor 47 drives a transmission gear 49 the rotary output of which, is transferred upon a flexible shafting 50. The control loop of the feedback control device in accordance with the invention is closed by an hydraulic control member 51, comprising a control valve 52 with an input conduit 53 connected to a suitable source of pressure fluid via a flexible hose 54. An exhaust conduit 55 communicates with the lower part of valve housing 52 and there is also provided a flexible connection 56 for this exhaust conduit. The piston 57 is slidably disposed in valve housing 52 co-operating with the piston rod 58 which is spring biased by means of a spring 59. Piston rod 58 is axially displaceable by a cam 60, which in turn is pivotable by means of a manually operated lever 61.

The piston 57 is controlled secondly by a flyball governor 62 rotatably geared to propeller shaft 4 by a transmission gear or rotary link 63. The valve housing 52 may also be displaced with respect to piston 57 via a worm gear 64 which is rotatably actuated by shaft 50. A conduit 65 links the control valve and the cavity of hollow shaft 4 for fluid conduction. Conduit 65 is at least partially flexible. This flexibility as well as that of elements 54 and 56 is necessary in order to permit movement, in the drawing vertical movement of valve housing 52.

The device as described, operates as follows: It is assumed that the given input power of the engine, not shown, causes shaft 4 to rotate at a particular speed. This speed is modified and finally determined by the momentary air resistance encountered by the propeller blades.

The variable drive 39 is adjusted to determine a particular propeller speed. For example, the control of motor 39 may be limited to the engine throttle (not drawn). Magnet 37 rotates and produces a train of pulses in inductor 36 then overcoming the negative cut-off bias by battery 35. The sharp positive pulses cause an anode plate current pulse of short duration to flow through tube 34 and a flash occurs in lamps 31 and 42.

The instrument propeller 26 might or might not be in phase with this flash, and this will be visually indicated on the screen 30. It is assumed that "in phase" is evidenced by an upright propeller image. Upright propeller image also coincides with an alignment of lamp 42, slot 28 and the overlapping position of the detector ranges of photo-electric detector amplifiers 43 and 44. The blades of the relays 45 and 46 denoted with subscript $a$ are so adjusted tho they open before those with subscript $b$ close. Thus a simultaneous response of detectors 43 and 44 causes both relays 45 and 46 to briefly respond, but their current supply is mutually interrupted immediately by opening of both the blades 46a and 45a; detectors 43 and 44 produce only pulses of very short duration and, therefore, no new responses of any of the relays 45 and 46 occur during this particular revolution of the disc 27.

It will be appreciated that nothing further will occur as long the rotation of shafts 25 and 40 is in phase as well as in complete speed synchronism.

Suppose now there is a difference in rotational speed of shafts 25 and 40, which means that visibly the image of propeller 26 on screen 30 starts to rotate at a speed which is the difference between the speeds of shafts 25 and 40. Accordingly the flash of lamp 42 is not in synchronism anymore with the position of slot 28 with respect to the detectors 43 and 44.

Suppose detector 43 only is aligned with slot 28 at the time lamp 42 flashes, while detector 44 does not respond. In that case only relay 45 responds completely and undisturbed, because blade 46a remains closed. Relay 45 accordingly closes contact 45b and selsyn motor 47 starts to run, thus turning shaft 50 and gear 49. The rotation of shaft 50 produces a vertical displacement of valve 52, for example, upwardly, so that conduit 53 is permitted to communicate with conduit 65, and pressure fluid enters hollow shaft 4. The pressure fluid is applied to tube 10 and cylinder 11 now moves upwardly against the tension of spring 12, thus increasing the pitch of propeller blades 1 and 2.

Motor 47 runs for a particular period of time, which is determined by the delayed response of circuit breaker 66. It will thus be apparent that selsyn 47, together with valve 51, causes the pressure in cylinder 11 to increase until the pitch of the blades 1 and 2 is so that synchronism between the signal input impulses derived from the rotation of motor 31, 39, and the rotation of shaft 25 with instrument propeller 26 and disc 27 is restored. The pilot can observe such regaining of synchronism by observing the movement of the propeller image on screen 30 back to a vertical position.

In case detector amplifier 44 responds, selsyn 47 is energized upon closing of blade 46b, and the motor rotates so as to lower valve housing 52 hereby causing conduit 65 to communicate with exhaust pipe 55—56. Accordingly spring 12 lower cylinder 11 and the pitch of blade 1 and 2 decreases. This control action is again carried out in steps with one step for each revolution of shafts 40 and 25, until synchronism is achieved again.

In case switch 48 is open, the pilot can manually increase and decrease the pressure in cylinder 11 by operating the lever 61 whereby the cam 60 moves piston rod 58 with respect to valve housing 52. Furthermore lever 61 can be used to initially produce synchronism of the propeller and the drive 39.

It will be appreciated that after a control action has been initiated in shifting valve housing 52 and piston 57 with respect to each other, a new state of balance between spring 59 and governor 62 will be observed, so as to restore a closed valve position, so as to maintain an increased or decreased speed of shaft 4; in other words the inlet of conduit 65 will be blocked off by piston 57 after the propeller has responded and assumed a new rotational speed, which speed then is transmitted to the flyball governor 62, to terminate the astatic action of the control device. From another aspect, control action is astatically initiated by the feed-back loop defined by the photo-electric device, the selsyn and the valve; and the flyball governor defines another loop for stabilizing the automatic control.

It will be appreciated that the apparatus, as disclosed, is capable of several modifications, e.g. magnet 37 and shaft 40 may be geared to the propeller, while the instrument propeller 26 and disc 27 may be geared to the variable speed drive 39. In other words, it is not essential that the stroboscopic light flashing device is operated by the input signal motor. It is possible that lamps 42 and 31 are operated, or ignited, in direct synchronism with the propeller, while disc 27 and instrument propeller 26 run in synchronism with drive 39 and, therefore, in synchronism with the input signal source.

The lamps 31 and 42 also can be united, and one lamp be employed only.

The manual control adjustment lever 61 may shift valve housing 52 while valve 50 operates a cam and piston rod 58. Detectors 43 and 44 may be used to be operated upon electronic uni-vibrators and the blocking blades 45a and 45b may be substituted by electronic gating circuits, preventing simultaneous actuation of the output elements controlled by detectors 43 and 44.

The invention is not limited to the embodiment described above, but all changes and modifications thereof, not constituting departments from the spirit and scope of the invention, are intended to be covered by the following claims.

I claim:

1. Automatic speed control apparatus for an aircraft propeller having variable pitch blades, comprising: means for adjusting the pitch of said propeller blades; a spring loaded cylinder-piston arrangement actuating said pitch adjusting means, the pressure balance in said cylinder determining the pitch of said blades; a first means for deriving a rotary motion from said propeller; a second means for producing a train of input pulses; a lamp operated by and connected to one of said first and second means; a disc with a slot positioned adjacent said lamp and set into rotation by the other one of said first and second means; photo-electric detection means sensing the relative phase position of said slot and said disc, and of the occurrence of light pulses produced by said lamp; a selsyn motor actuated by said detector means; a hydraulic control element governing the pressure in said cylinder and having two parts movable with respect to each other for control action, said motor upon being actuated adjusting one of said parts for initiating control action of said hydraulic control element; and a speed responsive element connected to said propeller and to said other part for terminating control action of said control element in response to a speed alteration of said propeller.

2. Automatic speed control apparatus for an aircraft propeller having variable pitch blades, comprising: means for adjusting the pitch of said propeller blades; a spring loaded cylinder-piston arrangement actuating said pitch adjusting means, the pressure balance in said cylinder determining the pitch of said blades; a first means for deriving a rotary motion from said propeller; a second means for producing a train of input signal pulses; a lamp operated by and connected to one of said first and second means; a disc with a slot positioned adjacent said lamp and set into rotation by the other one of said first and second means; a stroboscopic lamp ignited in synchronism with said lamp; an image screen positioned adjacent said stroboscopic lamp; an instrument propeller running in synchronism with said disc and being interposed in the light path from said stroboscopic lamp and said screen; photo-electric detection means sensing the relative phase position of said slot and said disc and of the occurrence of light pulses produced by said lamp; a selsyn motor actuated by said detector means; a hydraulic control element governing the pressure in said cylinder and having two parts movable with respect to each other for control action, said motor upon being actuated adjusting one of said parts for initiating control action of said hydraulic control element; and a speed responsive element connected to said propeller and to said other part for terminating control action of said control element in response to a speed alteration of said propeller.

3. Apparatus as set forth in claim 2 comprising: in addition, a manually operated control element for actuating upon said control element for initiating synchronism between said first and said second means.

4. Automatic speed control apparatus for an aircraft propeller having variable pitch blades, comprising: means for adjusting the pitch of said propeller blades; a spring loaded cylinder-piston arrangement actuating said pitch adjusting means, the pressure balance in said cylinder determining the pitch of said blades; a disc with a slot rotatably connected to said propeller for common rotation; a variable speed drive; an electronically operated lamp disposed adjacent said disc; means for operating said lamp in synchronism with said speed drive; two photo-electric detectors placed in the light paths extending from said lamp through said slot in a particular momentary position of said disc; two relays respectively connected to said detectors; a control motor capable of rotating in two directions and governed by said two relays with respect thereto, one for each direction of rotation; a hydraulic control element governing the pressure in said cylinder and having two parts movable with respect to each other for control action, said motor upon being actuated adjusting one of said parts for initiating control action of said hydraulic control element; and a speed responsive element connected to said propeller and to said other part for terminating control action of said control element in response to a speed alteration of said propeller.

5. Automatic speed control apparatus for an aircraft propeller having variable pitch blades, comprising: means for adjusting the pitch of said propeller blades; a hydraulic valve governing said pitch adjustment and having a housing and a piston movable with respect to each other; a manual control element for actuating upon one of said piston and said housing of said valve; a reversible electric motor for actuating upon the other one of said piston and said housing; a variable speed drive; a grid controlled electron tube rendered conductive in synchronism to said drive; a lamp arrangement connected to and controlled by said electron tube; an instrument propeller and a slotted disc drivingly connected in common to said aircraft propeller and disposed in the light path of said lamp arrangement; and a photo-electric phase detector responsive to a phase shift between disc and lamp actuation, and controlling said reversible motor.

References Cited in the file of this patent

UNITED STATES PATENTS

| | | |
|---|---|---|
| 2,125,408 | Urfer | Aug. 2, 1938 |
| 2,319,218 | Drake | May 18, 1943 |
| 2,357,055 | Mydans | Aug. 29, 1944 |
| 2,924,940 | Covert et al. | Feb. 16, 1960 |

FOREIGN PATENTS

| | | |
|---|---|---|
| 1,023,125 | France | Dec. 24, 1952 |